J. MUSKETT.
RUBBER COVERED ROLLER.
APPLICATION FILED FEB. 16, 1918.
1,277,995.
Patented Sept. 3, 1918.
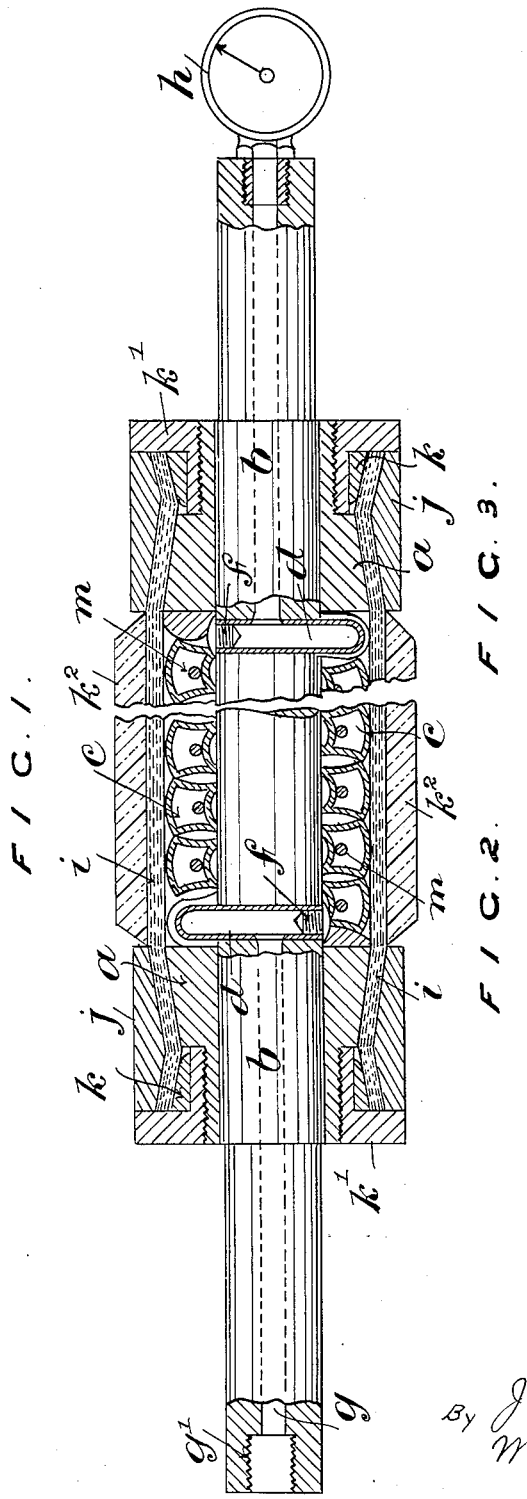
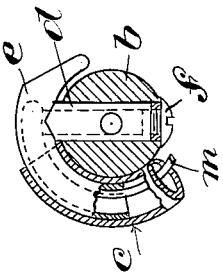
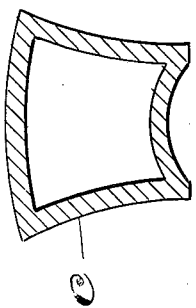
INVENTOR:
By Jabez Muskett
Wm Wallace White
ATT'Y.

UNITED STATES PATENT OFFICE.

JABEZ MUSKETT, OF PENDLETON, MANCHESTER, ENGLAND, ASSIGNOR TO F. REDDAWAY AND COMPANY LIMITED, OF PENDLETON, MANCHESTER, ENGLAND.

RUBBER-COVERED ROLLER.

1,277,995.     Specification of Letters Patent.     Patented Sept. 3, 1918.

Application filed February 16, 1918. Serial No. 217,685.

*To all whom it may concern:*

Be it known that I, JABEZ MUSKETT, a subject of the King of Great Britain and Ireland, residing at 42 Delamere avenue, Pendleton, Manchester, in the county of Lancaster, England, engineer, have invented new and useful Improvements in Rubber-Covered Rollers, of which the following is a specification.

The invention has reference to rubber covered rollers of the cushion type used in various machines, and is an improvement upon an invention for which I have obtained Letters Patent No. 1,226,984.

In the type of roller to which the invention relates a metal mandrel or core is provided with a spiral winding of rubber tubing which is under fluid pressure. Around this spiral tubing is a wrapping of fabric such as canvas and an outer sleeve of rubber is vulcanized upon the canvas wrapping such rubber sleeve providing the periphery of the roller. The present invention relates particularly to the rubber tubing, and also to means for securing the wrapping of canvas at each end of the roller.

In the accompanying drawings—

Figure 1 shows a roller, broken in length, constructed in accordance with my invention, in sectional side elevation.

Fig. 2 is a section of the new rubber tubing on an enlarged scale.

Fig. 3 is a detail part.

In constructing the roller I provide a collar $a$ near each end of the metal mandrel or core $b$ the ends of the core projecting beyond the collars $a$ to form the bearings for the roller. The collars may be turned out of the metal of the core, or may be separate therefrom as shown and secured to the core in any convenient manner. Each collar $a$ on the inside is formed tapering or inclined upward and inward and outside this taper the collar is reduced in diameter, and screw threaded.

The rubber tubing $c$ designed by me for the purposes of my invention is shaped as shown in cross section in Fig. 2. It is substantially square in cross section but with an arched roof, incurved sides and concave base the bore also coinciding with the shape. I have found that such shape of rubber tubing answers the purpose very effectively being very resilient under crushing strain and will collapse under undue external pressure without receiving damage. The rubber tubing $c$ is wound spirally around the mandrel between the collars and means are provided as in my former invention to inflate it with air. Such means consist in providing the shaft $b$ at, and near each end, with a cross tube $d$ forced tightly into a hole bored in the shaft, and brazed or otherwise secured to a crescent shaped piece $e$ which is bored out at one end only with a passage to communicate with a hole in the tube $d$ as shown in Fig. 3. The cross tube is blocked up at one end by means of the stud $f$. A hole $g$ is bored through the end of the shaft $b$ and into the cross tube $d$ and one end of the shaft is provided at $g'$ with any suitable type of non-return valve the other end having a pressure gage $h$. The ends of the spiral tubing $c$ are forced on the crescent pieces $e$ as shown in Fig. 3. The fabric $i$ is wrapped around the rubber tubing and the inclined or tapered periphery of the end collars $a$ and improved means under my present invention are provided to jam it securely upon the collars. To effect this a shell of metal $j$ formed on the inside with an internal taper corresponding to the taper on the collars $a$ is threaded on the end of the wrapping of fabric. This shell at the outside is also formed with an internal taper directed outward and upward.

A ring $k$ having a taper part corresponding to the outer taper of the shell $j$ is disposed on the wrapping of fabric. A clamping ring $k'$ is then screwed on the reduced screwed extension of the collar $a$. When this clamping ring is screwed home the end of the wrapping of fabric is inclosed between the shell, the ring $k$ and the collar as shown in the drawing and the fabric is securely bound or clamped upon the end collar. The ring $k$ serves to prevent any injury being done to the wrapping of fabric $i$ when screwing home the clamping ring $k'$. The clamping ring $k'$ would be provided with recesses or the like to enable it to be screwed on the collar by a special tool and the ring may be secured to the collar by a grub screw or the like. The outer rubber sleeve $k^2$ which is vulcanized upon the wrapping of fabric may terminate at the inner ends of the collars $a$ as shown, or it may be made long enough to cover and be flush with the clamping ring. Air is pumped through the non-return valve into the tubing until the desired pressure therein is attained, as indicated by the gage. Although air is preferable the tubing may be filled with water or other fluid. To prevent the coils of tubing *c* from creeping longitudinally, I inclose a stout copper or like wire *m* in the tubing as before to bind the spiral tubing securely upon the metal core or mandrel. The ends of the copper wire are securely anchored, which may be effected by brazing the ends within the crescent shaped fittings *e* upon which the rubber tubing is forced as shown in Fig. 3. The wire *m* may however be dispensed with.

I declare that what I claim is—

1. In combination, a roller comprising a metal core with end collars and journals, rubber tubing of substantially square cross section having an arched roof, incurved sides and concave base, said tubing being wound spirally around said metal core and between said collars, means for inflating said rubber tubing, a wrapping of flexible material around said rubber tubing, a rubber envelop for said flexible material, and means for securing the flexible material to said metal core, said means comprising a collar formed with a tapered outer surface and a reduced annular extension, a clamping ring threadedly engaging said extension and formed with a shoulder, a shell surrounding said collar and having a double tapered inner surface, and a ring having a tapered outer surface, said ring being interposed between said collar and clamping ring and abutting said shoulder whereby said clamping ring is free to rotate for the purpose described.

2. In combination, a mandrel, a roller carried by the mandrel and including a piece of flexible material, and means for securing the flexible material to said mandrel comprising a collar formed with a tapered outer surface and a reduced annular extension, a clamping ring threadedly engaging said extension and formed with a shoulder, a shell surrounding the collar and having a double tapered inner surface, and a ring having a tapered outer surface, said ring being interposed between said collar and clamping ring and abutting said shoulder whereby said clamping ring is free to rotate for the purpose described.

In testimony whereof I have signed my name to this specification.

JABEZ MUSKETT.